United States Patent [19]
Gregorio et al.

[11] Patent Number: 5,816,359
[45] Date of Patent: Oct. 6, 1998

[54] CONTROL VALVE FOR A HYDRAULIC STEERING SYSTEM

[75] Inventors: Angelo Gregorio; Claudio Baldrati, both of Modena, Italy

[73] Assignee: New Holland North America, Inc., New Holland, Pa.

[21] Appl. No.: 666,731

[22] Filed: Jun. 18, 1996

[30] Foreign Application Priority Data

Jun. 23, 1995 [EP] European Pat. Off. .............. 95830266

[51] Int. Cl.⁶ ............................................... B62D 5/087
[52] U.S. Cl. ............................ 180/403; 180/441; 91/420; 91/447
[58] Field of Search ................................... 180/403, 417, 180/441, 442; 137/106, 269; 91/420, 447, 6, 32, 33, 452; 60/494

[56] References Cited

U.S. PATENT DOCUMENTS

| | | | |
|---|---|---|---|
| 3,543,647 | 12/1970 | Hall | 91/420 |
| 3,576,192 | 4/1971 | Wood | 91/420 |
| 3,818,936 | 6/1974 | Jackoboice et al. | 91/420 |
| 3,974,742 | 8/1976 | Johnson | 91/420 |
| 4,085,817 | 4/1978 | Kervagoret | 180/442 |
| 4,189,023 | 2/1980 | Karcher et al. | 180/442 |
| 4,194,432 | 3/1980 | Hall | 91/447 |
| 4,286,432 | 9/1981 | Burrows et al. | 91/420 |
| 4,669,494 | 6/1987 | McBeth | 91/420 |
| 5,349,818 | 9/1994 | McFadyen et al. | 91/420 |
| 5,400,816 | 3/1995 | Gerstenberger | 137/106 |

FOREIGN PATENT DOCUMENTS 62-061877  3/1987  Japan .............................. B62D 5/09

Primary Examiner—Daniel G. DePumpo
Attorney, Agent, or Firm—Larry W. Miller; J. William Stader; Frank A. Seemar

[57] ABSTRACT

A control valve is provided for use in a hydraulic steering system of an agricultural vehicle of the type having a steering valve of the reactive type for controlling the supply of hydraulic fluid to hydraulic cylinders having opposed working chambers serving to move the steerable vehicle wheels in opposite directions. The control valve is connectable between the steering valve and the hydraulic cylinders and has a first setting in which fluid flow in both directions between the steering valve and the working chambers of the hydraulic steering cylinders is possible at all times and a second setting in which return flow of hydraulic fluid from any one working chamber of the hydraulic cylinders to the steering valve is only possible when a positive pressure is present at the outlet of the steering valve connected by the control valve to the opposed working chamber of the hydraulic cylinders.

8 Claims, 5 Drawing Sheets

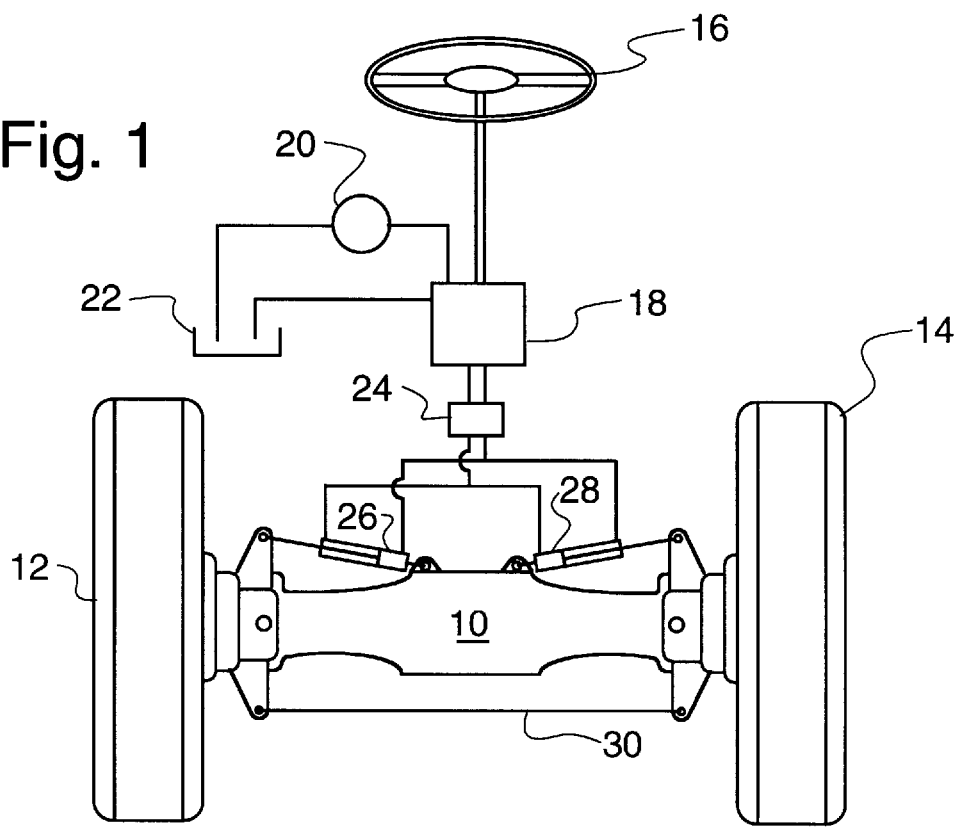
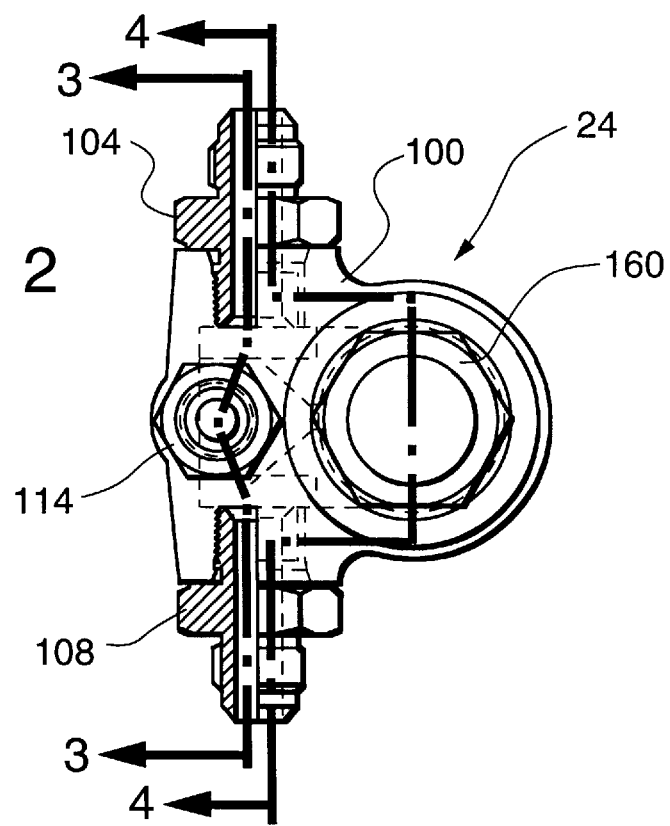

CONTROL VALVE FOR A HYDRAULIC STEERING SYSTEM

BACKGROUND OF THE INVENTION

The present invention relates to a control valve for a hydraulic steering system intended for agricultural vehicles such as tractors.

It is known to provide tractors with either of two forms of steering, termed reactive and non-reactive steering. Reactive steering is essentially the same as that used in road vehicles in which the driver can feel the steering and will notice a reaction from the road wheels if the vehicle drives over a bump or the wheels get stuck in a furrow. Non-reactive steering, on the other hand, is used when towing a plough. Here the driver can set a desired direction and the tractor will not deviate from this direction, even if obstructions are met by the wheels. Non-reactive steering is clearly desirable when ploughing a field but it is disconcerting when used on roads because the driver must remember to turn the steering wheel on leaving as well as entering a bend. A vehicle with non-reactive steering has no self-righting action and if the steerable wheels are set at an angle, the vehicle will continue to move indefinitely in a circle of constant radius.

SUMMARY OF THE INVENTION

The object of the invention is to provide a control valve for use in a hydraulic steering system, especially for an agricultural vehicle, to enable the steering characteristics to be switched between reactive and non-reactive steering.

According to one aspect of the present invention, there is provided a control valve for use in a hydraulic steering system of an agricultural vehicle of the type having a steering valve of the reactive type for controlling the supply of hydraulic fluid to hydraulic steering cylinders having opposed working chambers serving to move the steerable vehicle wheels in opposite directions, the control valve being connectable between the steering valve and the hydraulic steering cylinders and having a first setting in which fluid flow in both directions between the steering valve and the working chambers of the hydraulic steering cylinders is possible at all times and a second setting in which return flow of hydraulic fluid from any one working chamber of the hydraulic steering cylinders to the steering valve is only possible when a positive pressure is present at the outlet of the steering valve connected by the control valve to the opposed working chamber of the hydraulic steering cylinders.

According to a second aspect of the invention, there is provided a control valve connectable between a steering valve of the reactive type and hydraulic steering cylinders acting upon the steerable wheels of a vehicle, the control valve having two inlets for lines leading to the steering valve, two outlets for lines leading to the hydraulic steering cylinders, two one-way valves each connected between a respective inlet and a respective outlet, means for acting on each one-way valve to open it for flow in both directions in response to the presence of a positive pressure at the inlet connected to the other one-way valve and means for selectively establishing permanent connections in both directions between the respective inlets and outlets regardless of the pressures prevailing at the inlets and outlets.

The means for establishing a permanent connection between the respective inlets and outlets may either be means for selectively by-passing the one-way valves or means for selectively rendering the one-way valve inoperative, such as by lifting the valve closure members of the one-way valves off their seats.

The control valve of the invention can be used as an adjunct to a steering valve of the reactive type to allow non-reactive steering to be selected. To convert a reactive steering valve to one that is non-reactive, it is necessary to prevent the positive reaction pressures generated in the hydraulic steering cylinders when the steerable wheels meet an obstruction from reaching the steering valve. It is not possible simply to use one-way valves on their own to prevent flow from the hydraulic steering cylinders to the steering valve because during normal steering movements when hydraulic fluid is supplied from the steering valve to one working chamber of the hydraulic steering cylinders, fluid is returned from another working chamber to the steering valve and such return flow must not be prevented. The valve must therefore be capable of distinguishing between return flow resulting from a reaction from the steerable wheels and return flow resulting from the supply of hydraulic fluid to another working chamber of the hydraulic steering cylinders by the steering valve as a result of movement of the steering wheel by the driver.

In the present invention, the pressure at the inlets of the control valve is monitored, while the valve is set to provide non-reactive steering. If neither inlet is at a high pressure, then return flow from the hydraulic steering cylinders to the steering valve is prevented. On the other hand, if there is a positive pressure at one of the inlets connected to the steering valve, then not only is fluid allowed to flow through the control valve to the associated working chamber of the hydraulic steering cylinders, but return flow is permitted in the line connecting the other working chamber of the hydraulic steering cylinders to the steering valve.

The hydraulic steering cylinders preferably comprise a double acting piston-cylinder unit acting on each of the steerable wheels of the vehicle. Because the wheels are normally interlinked mechanically to move together, it would suffice to provide a single double acting piston-cylinder unit acting on only one of the steerable wheels or to provide two single acting piston-cylinder units each acting on a respective wheel but it is preferred to distribute the steering force evenly between the two wheels.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a schematic representation of a hydraulic steering system of a tractor having selectable steering characteristics;

FIG. 2 is a partial section through a control valve of a first embodiment of the invention;

DETAILED DESCRIPTION OF THE PREFERRED EMBODIMENT

Figure 3:
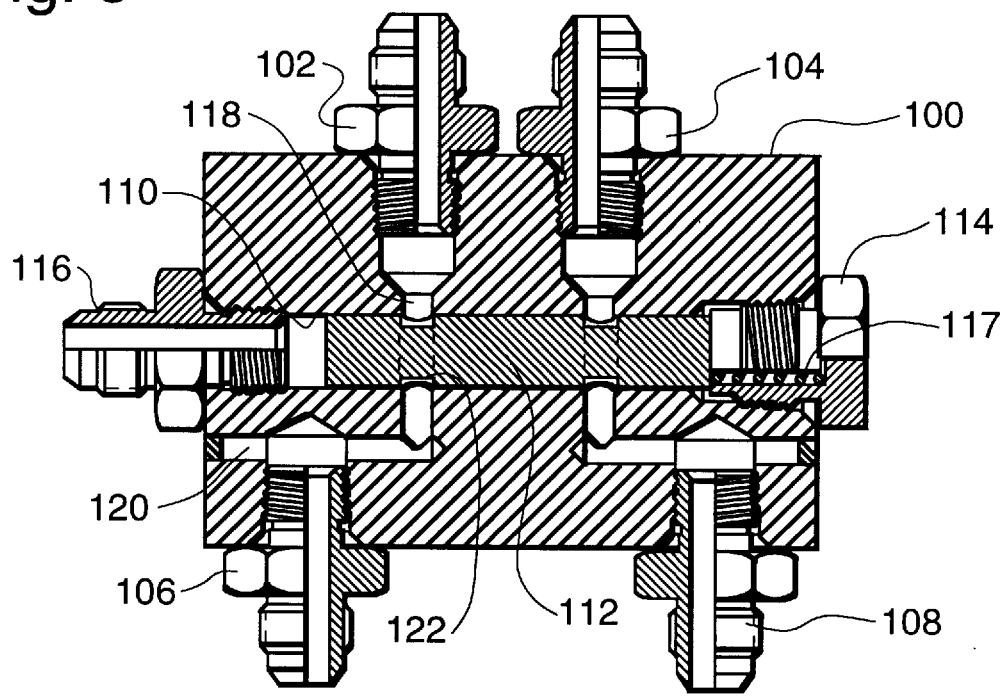
FIG. 3 is a section taken along the line III—III in FIG. 2.

In FIG. 1, a tractor has a front axle 10 with two steerable wheels 12 and 14. The steering wheel 16 of the tractor is connected to a known steering valve 18 of the reactive type, for example a Danfoss valve, that has inlet connections leading to an engine driven pump 20 and a hydraulic fluid reservoir 22. The steering valve 18 also has two fluid outlets that are connected by way of a control valve 24 of the present invention to the opposed working chambers of each of two double acting hydraulic steering cylinders 26 and 28 that act on the respective steerable wheels 12 and 14. The wheels are also connected to one another by a tie rod 30, so as always to move in unison.

The control valve 24 has a first setting that connects each of its two inlets connected to the steering valve 18 to a respective one of its two outlets connected to opposite sides of each double acting hydraulic cylinder 26, 28. In this setting, when the steering wheel 16 is turned, the pump 20 is connected by the steering valve 18 to one of the working chambers of each hydraulic cylinder 26, 28 and the fluid from the opposed working chambers of the hydraulic cylinders 26, 28 is returned to the reservoir 22 by the steering valve 18. The fluid displacement results in movement of the pistons of the hydraulic cylinders 26 and 28 until the steerable wheels 12 and 14 reach the position corresponding to the desired position set by the steering wheel. At this point, the steering valve 18 will isolate the hydraulic cylinders 26 and 28 from the pump 20 and the reservoir 22.

If in this setting of the control valve 24 one of the steerable wheels 12 and 14 should meet an obstruction tending to make the vehicle veer away from the direction set by the steering wheel 16, then the hydraulic cylinders 26 and 28 will produce a pressure difference on the lines connecting them to the steering valve 18. Because the steering valve 18 is of the reactive type, the steering valve 18 will apply a torque to the steering column, tending to rotate the steering wheel 16 in the direction corresponding to the angle of the steerable wheels as induced by the obstruction.

In the other setting of the control valve 24, flow of hydraulic fluid from the steering valve 18 to a working chamber of one of the hydraulic cylinders 26, 28 can always take place in the forward direction but return flow is normally blocked. For this reason, if pressure is built up in the hydraulic cylinders 26, 28 on account of a steerable wheel 12, 14 meeting an obstruction, that high pressure is not transmitted back to the steering valve 18 and there is therefore no reaction torque on the steering wheel 16.

The steering system therefore behaves as a non-reactive system. However, even in this setting of the valve 24 it is necessary to allow return flow from the hydraulic cylinders 26, 28 to the reservoir 22 when the steering wheel is turned by the tractor operator and to enable this to take place the control valve 24 acts to permit return flow along one of the lines connecting the steering valve 18 to the hydraulic cylinders 26, 28 when a high pressure is sensed at the other outlet of the steering valve 18 connected to the hydraulic cylinders 26, 28. Such a high pressure will be present when return flow is required to enable a movement of the steerable wheels 12 and 14 initiated by rotation of the steering wheel 16 but will be absent when the steerable wheels are deflected by encountering an obstacle.

Figure 4:
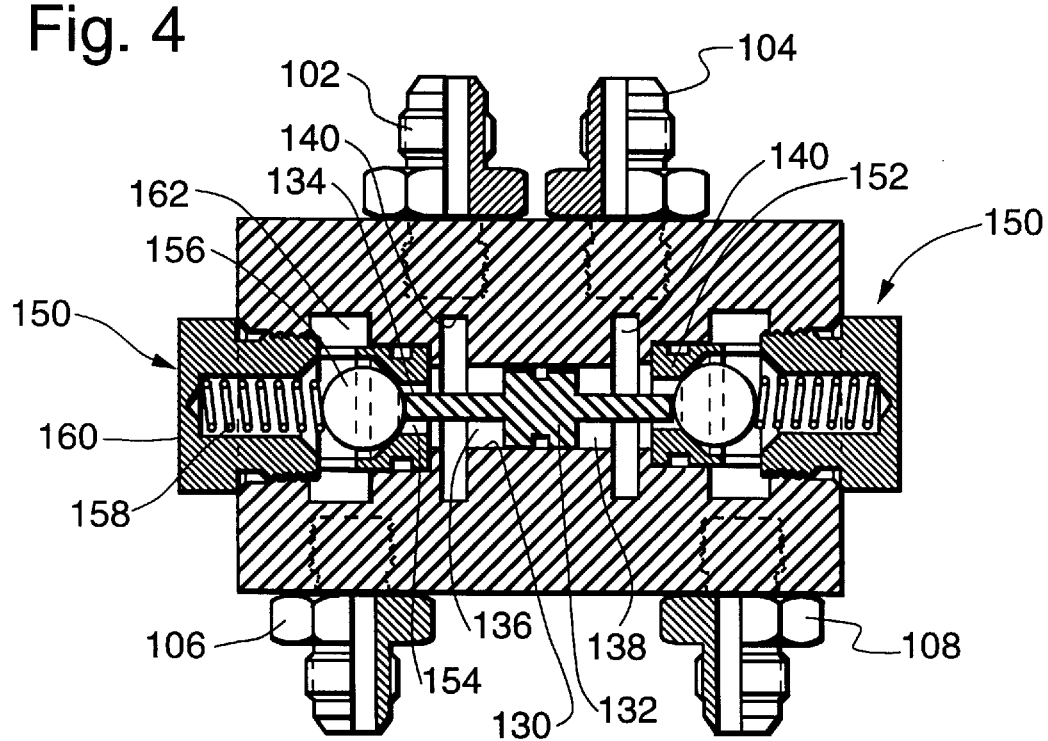
FIG. 4 is a section taken along the line IV—IV in FIG. 2.

A first embodiment of the control valve 24 that operates in the manner described above to allow the steering characteristics of a vehicle to be varied will now be described by reference to FIGS. 2 to 4, in which FIG. 2 is a side view of the valve 24 and FIGS. 3 and 4 are sections on the lines III—III and IV—IV respectively.

The valve 24 has a main body 100 with two inlets 102, 104 and two outlets 106, 108. The inlets 102, 104 are externally connected to lines leading to the steering valve 18 and the outlets are connected to lines leading to the opposed working chambers of the hydraulic cylinders 26, 28.

Within the main body 100, each of the inlets 102 and 104 is connected to a respective one of the two outlets 106 and 108 by two parallel paths, one path being shown in the section of FIG. 3 and the other in the section of FIG. 4. It will be noted that the control valve 24 is generally symmetrical about a central plane, and the functions served by the two halves of the valve 24 are identical. To avoid duplication of description, the same reference numerals have been allocated to parts serving the same function.

As shown in FIG. 3, the body 100 has a first transverse bore 110 in which there is slidably received a valve spool 112. The bore 110 is closed at one end by a blanking plug 114 and has a connector 116 at its other end to allow the application of a control pressure for moving the valve spool 112 from left to right as viewed. A return spring 117 acts between the right hand end of the spool 112, as viewed, and the plug 114. This method of moving the valve spool 112 is given only as an example and one may alternatively provide pressure chambers at both ends of the spool 112. In fact, the spool also may be electrically controlled by a solenoid or even mechanically controlled, if desired.

The bore 110 communicates with the inlet 102 and the outlet 106 through respective drillings 118, 120. The spool 112 has an annular recess 122 that permits fluid to flow from the drilling 118 to the drilling 120 when the spool is in the position illustrated. When, on the other hand, the spool 112 is moved to the left, as viewed, then the body of the spool 112 closes off the drillings and isolates the inlet 102 from the outlet 106. Thus, with the spool 112 in the position illustrated, the inlets 102 and 104 are permanently connected to the respective outlets 106 and 108 for flow in both directions, this being the position for reactive steering. On the other hand, when the spool is moved to the left, as viewed, there is no connection between the inlets and the outlets across the bore 110 and this is the position corresponding to non-reactive steering when fluid flow can only occur through the second fluid path now to be described with reference to FIG. 4.

A stepped bore 130 is formed in a plane offset from that of the bore 110, the bore being narrowest at its center and increasing in diameter in both directions away from the center. A double acting piston 132 with two axially extending pins 134 is slidable within the narrowest section of the bore 130 and its two faces constitute the movable walls of two variable volume working chambers 136 and 138. Each working chamber 136, 138 communicates with a respective one of the inlets 102 and 104 through an annular recess 140 and a drilling that lies outside the plane of FIG. 4.

Each end of the bore 130 is closed off by a one-way valve, that is generally designated 150. Each valve 150 comprises a ring 152 that rests against a shoulder in the bore 130 and is sealed relative to the bore 130. The ring 152 has a central hole 154 that acts as the inlet to the one-way valve 150 from the working chamber 136 or 138. The ring 152 also defines a conical valve seat for a ball 156 that acts as the valve closure element, the ball 156 being urged towards the valve seat by a spring 158 that reacts against a plug 160 screwed into the end of the bore 130. Further annular recesses 162 form chambers on the opposite sides of the balls 156 from the working chambers 136 and 138 and connect the one-way valves 150 to the respective outlets 106, 108 through further drillings lying outside the plane of FIG. 4.

When pressure is applied to either or both of the outlets 106 and 108, it is blocked by the one-way valves 150 and cannot reach the inlets 102 and 104 through the second fluid path as shown in FIG. 4. Therefore, in case the valve spool 112 of FIG. 3 is located in its left position, as viewed, meaning that there is equally no connection between the inlets 102, 104 and the outlets 106, 108 across the bore 110, any pressure generated by reaction from the steerable wheels is not conveyed to the steering valve 18 and no torque is felt on the steering wheel 16.

When however a positive pressure is applied to either one of the inlets 102 and 104 by the steering valve 18, the pressure in the chamber 136 or 138 will directly act on the ball 156 of the associated one-way valve 150 to lift the ball 156 off its valve seat and supply fluid under pressure by way of the associated outlet 106 or 108 to a working chamber of the hydraulic steering cylinders 26 and 28. At the same time, the pressure in the chamber 136 or 138 will act on the piston 132 to move it towards the other one-way valve 150. As the piston 132 is moved, its pin 134 passes through the hole 154 of the ring 152 of the other one-way valve 150 and lifts the ball 156 off its seat. The latter valve is therefore also opened to allow the return flow to the reservoir 22 of fluid from the opposed working chambers of the hydraulic cylinders 26 and 28.

Figure 5:
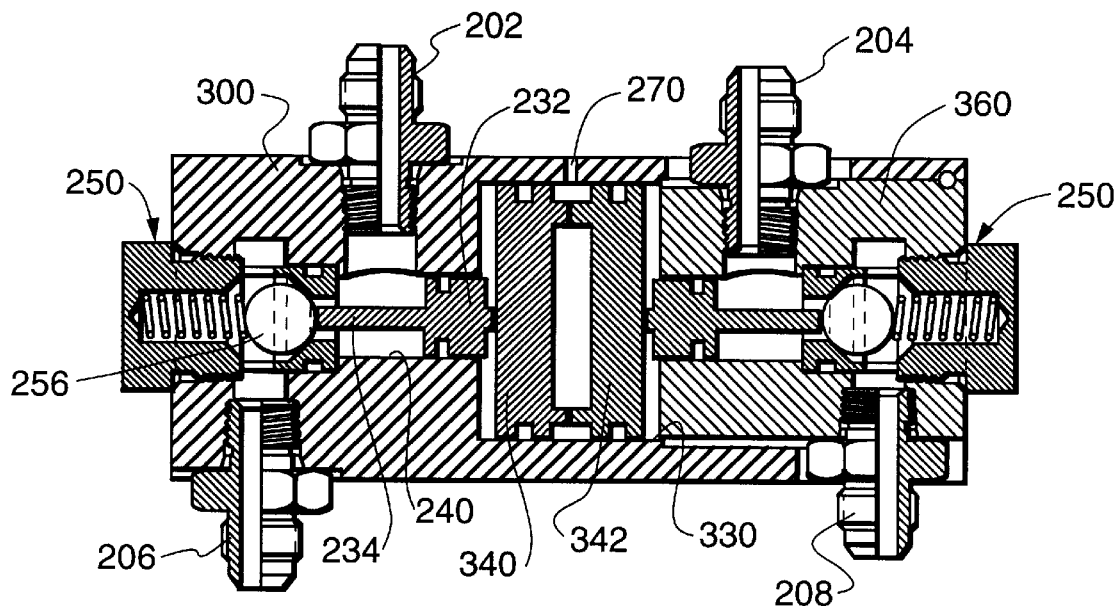
FIG. 5 is a lengthwise section through a second embodiment of the control valve.

In the embodiment of FIG. 5, the inlets 202 and 204 are connected to the outlets 206 and 208 only through one-way valves 250, there being no separate spool valve. Reactive steering is achieved by using a control pressure applied to a control inlet 270 to lift the balls 256 of both one-way valves simultaneously off their seats whereas non-reactive steering is achieved when there is no control pressure applied. In the non-reactive condition, steering action is obtained by opening one valve 250 directly and the other valve 250 indirectly when a positive pressure is applied to one of the two inlets 202, 204.

More specifically, the main valve body 300 in this case has a stepped bore 240 at one end which is generally similar to the left half of the bore 130 in FIG. 4 and contains a sliding piston 232, a non-return valve 250 and a pin 234 on the piston 232 for lifting the ball 256 of the valve 250 off its seat. The other end of the body 300 has a large diameter bore 330 in which there are slidable two large diameter pistons 340, 342 disposed back to back one on each side of the control inlet 270. An insert 360 is then placed in the large diameter bore 330 to close it, the insert having within it the same components as the other end of the body 300. It will be appreciated that the body 300 needs to be formed in two separable parts in this case because the diameter of the pistons 340 and 342 is greater than the diameter of the bores 240 and if the body were in one piece, assembly would not be possible.

Figure 6:
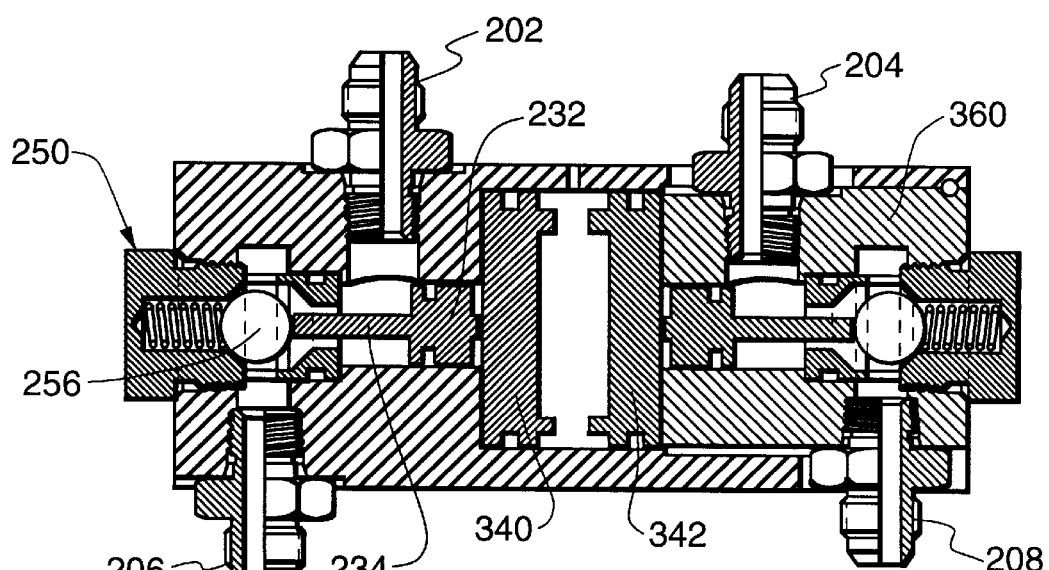
FIGS. 6 and 7 are views similar to FIG. 5 but showing the control valve under other operating conditions.

If a control pressure is applied to the control inlet 270, which is the condition shown in FIG. 6, the pistons 340 and 342 are moved apart as much as possible and in the process they will displace the pistons 232 so their pins 234 will lift the balls 256 of both non-return valves 250 off their seats. The inlets 202 and 204 are then permanently connected to the outlets 206 and 208, respectively, for flow in both directions, giving rise to reactive steering. Because of the large area of the pistons 340, 342 as compared with the pistons 232, a relatively low control pressure, for example 16 bar, will suffice in maintaining both non-return valves 250 open.

Figure 7:
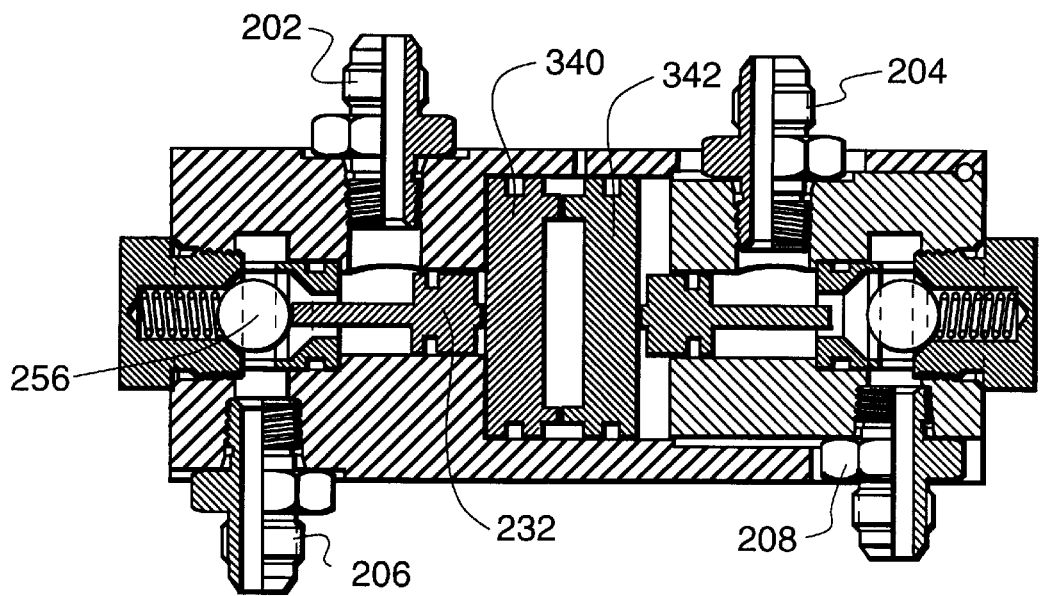

In the absence of a control pressure and when a steering action is performed, as exemplified in FIG. 7, one of the pistons 232 will move the pistons 340 and 342 into abutment with one another and the four pistons 232, 340, 342 and 232 will then move as one from right to left (or vice versa) in dependence upon the pressure at the inlets 202 and 204 in the same way as the single piece double acting piston 132 in FIG. 4. The control valve will therefore now provide non-reactive steering in which reaction pressures in the working chambers of the hydraulic cylinders 26 and 28 will be isolated from the steering valve by the non-return valves 250 but in which forward and return flow will be possible between the steering valve 18 and the hydraulic cylinders 26 and 28 when the relatively high pressure from the pump 20, which is typically 160–170 bar, is applied to one of the inlets 202 and 204.

Figure 8:
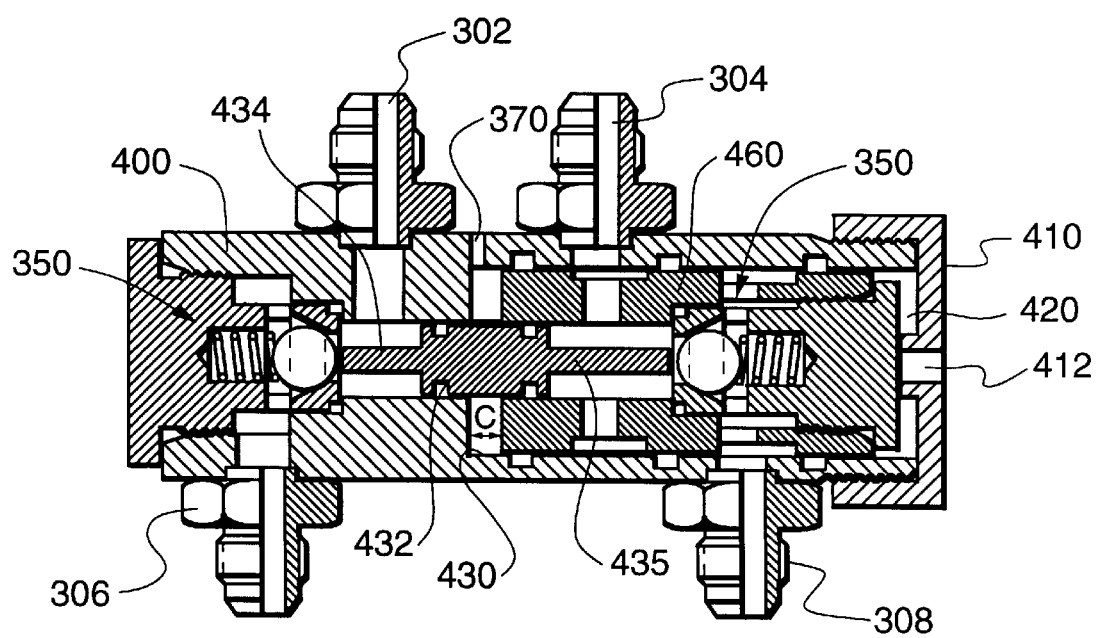
FIG. 8 is a section similar to that of FIG. 5 showing a third embodiment of the control valve.

The embodiment shown in FIG. 8 is similar to that of FIG. 5 in that the application of a control pressure opens the non-return valves 350 instead of by-passing them in order to obtain reactive steering. The control valve in this embodiment again has two inlets 302, 304 and two outlets 306, 308 all formed in a valve body 400. At its left end, the body 400 has a stepped bore that receives a sliding piston 432 with an extension pin 434 and a non-return valve 350 of the same general construction as described previously. At its other end, the body 400 has a large diameter bore 430 that receives a sliding piston assembly 460 which itself has a stepped inner bore receiving part of the piston 432 with an extension pin 435 and a non-return valve 350. Although the piston 432 is shown to be a single component, it also may be made of two parts, for ease of manufacture. The end of the body 400 is fitted with a cap 410 comprising a control pressure inlet 412 to allow hydraulic fluid to be introduced into a variable volume working chamber 420 defined between the cap 410 and the piston assembly 460.

The control valve in FIG. 8 is shown in the nonreactive position with the piston assembly 460 tight against the cap 410. In this position, the one-way valves 350 are normally closed and will remain closed if pressure is only present at the outlets 306, 308. If however pressure is applied to one of the inlets 302, 304, fluid will flow through the associated forward biased one-way valve and the pressure acting on the piston 432 will apply a force by way of the pin 435, respectively 434, to lift the ball of the other valve 350 off its seat.

Figure 9:
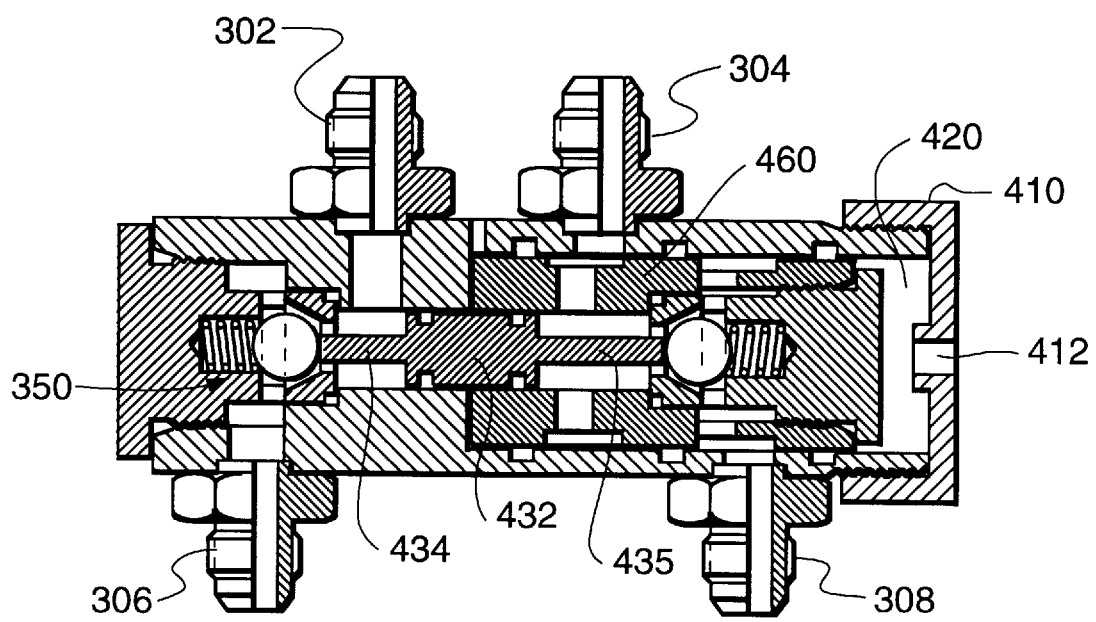
FIG. 9 is a view similar to FIG. 8 but showing another operating condition of the third embodiment.

In this position, there is a gap "c" between the piston 460 and the body 400 which is larger than the maximum displacement of the ball of one of the one-way valves 350 but less than twice that displacement. As a result, when a pressure is applied to the working chamber 420 between the right hand end of the piston 460 and the cap 410 (which is the condition shown in FIG. 9), the piston closes this gap completely and in the process the pins 434 lift the balls of both the one-way valves 350 off their seats, rendering the both valves inoperative and permitting fluid flow in both directions for reactive steering.

The chamber between the left hand end of the piston 460 and the body 400 has an outlet 370. This outlet is illustrated as being a vent to atmosphere to prevent pressure in this chamber from preventing movement of the piston 460. This chamber may alternatively be connected to a low pressure supply to move the piston 460 back into the illustrated non-reactive position. If the outlet 370 acts merely as an air vent, a return force for moving the piston 460 to the illustrated position will be provided by the piston 432 the first time that the inlet 302 is pressurized by the steering valve 18, after non-reactive steering has been selected, or alternatively by means of spring means (not shown) acting between the valve body 400 and the piston 460.

In all three described embodiments, the switching between steering characteristics may either be selected by the driver or it may take automatically. In the latter case, the control pressure or electrical signal required to change the steering mode may be generated in dependence upon speed, upon load, the selected transmission gear or any other parameter indicating agricultural use of the tractor as opposed to road use. The tractor steering characteristics will therefore adapt themselves to the driving conditions without any input from the driver, providing reactive steering when the vehicle is moving at speed on normal roads and non-reactive steering when e.g. ploughing or moving slowly through a field.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a hydraulic steering system having the option of reactive and non-reactive steering and for controlling the steering movement of steerable wheels of an agricultural vehicle, including a steering valve of the reactive type for controlling the supply of hydraulic fluid to hydraulic steering cylinders having opposed working chamber serving to move the steerable wheels in opposite directions, a control valve being connectable between the steering valve and the hydraulic steering cylinders, the improvement comprising:

said control valve having a first setting in which fluid flow in both directions between the steering valve and the working chambers of the hydraulic steering cylinders is possible at all times; and a second setting in which return flow of hydraulic fluid from any one working chamber of the hydraulic steering cylinders to the steering valve is only possible when a positive pressure is present at the outlet of the steering valve connected by the control valve to the opposed working chamber of the hydraulic steering cylinders.

2. The steering system of claim 1 wherein said control valve includes:

a pair of one-way valves each being connected between a respective inlet and a respective outlet;

means for acting on each one-way valve to open the corresponding one-way valve for flow in both directions in response to the presence of a positive pressure at the inlet connected to the other one-way valve; and means for selectively establishing permanent connections in both directions between the respective inlets and outlets regardless of the pressures prevailing at the inlets and outlets.

3. The steering system of claim 2 wherein the two one-way valves are symmetrically disposed in a housing at the ends of axially aligned bores, hydraulic pressure acting on the intake side of each valve also acting on one face of a piston that is slidably mounted within the associated bore to move the piston in the direction of the other one-way valve, such movement resulting in the piston acting directly or indirectly on a pin that opens the other one-way valve by raising the valve closure member of said other one-way valve off its seat.

4. The steering system of claim 3 wherein two separate pistons are located in the aligned bores each having on its face directed towards the associated one-way valve an axially projecting pin for raising the valve closure member off its seat, the opposite face of each piston acting on a respective one of two further pistons of larger diameter that are separated by a further working chamber connectable to a control pressure, whereby in the presence of a control pressure the smaller pistons are moved apart and open both one-way valves for flow in both directions and in the absence of a control pressure the four pistons move in unison to open one of said one-way valves for flow in both directions when a positive pressure is applied to the intake side of the other one-way valve.

5. The steering system of claim 3 wherein a single double acting piston is located in the axially aligned bores, each face of the piston being acted upon by the pressure prevailing at the intake side of a respective one of the one-way valves and each face having a pin that projects axially therefrom and is aligned with a hole in the valve seat of the other one-way valve, which hole is blocked by the valve closure member of the other one-way valve when the latter valve is closed.

6. The steering system of claim 5 wherein the means for establishing a permanent connection between the respective inlets and outlets comprises means for selectively by-passing the one-way valves.

7. The steering system of claim 6 wherein the means for selectively by-passing the one-way valves comprises a spool valve.

8. The steering system of claim 5 wherein one of the non-return valves is mounted in a large diameter piston assembly and wherein the means for opening the on the one-way valves for flow in both directions comprise means for applying a control pressure to one end of the piston assembly to move the piston assembly 460 in the valve housing and reduce the distance between the one-way valves, the valves being opened by coming into contact with the ends of the pins projecting from the opposite faces of the double-acting piston.

* * * * *